US012703371B2

(12) United States Patent
Suh et al.

(10) Patent No.: US 12,703,371 B2
(45) Date of Patent: Aug. 11, 2026

(54) VEHICLE CONTROL DEVICE AND METHOD

(71) Applicants: HYUNDAI MOTOR COMPANY, Seoul (KR); KIA CORPORATION, Seoul (KR); Korea University Of Technology And Education Industry-University Cooperation Foundation, Cheonan-si (KR)

(72) Inventors: Jee Yoon Suh, Hwaseong-si (KR); Seung Han You, Seoul (KR); Wan Ki Cho, Suwon-si (KR)

(73) Assignees: HYUNDAI MOTOR COMPANY, Seoul (KR); KIA CORPORATION, Seoul (KR); Korea University Of Technology And Education Industry-University Cooperation Foundation, Cheonan-si (KR)

( * ) Notice: Subject to any disclaimer, the term of this patent is extended or adjusted under 35 U.S.C. 154(b) by 13 days.

(21) Appl. No.: 18/917,484

(22) Filed: Oct. 16, 2024

(65) Prior Publication Data

US 2025/0353494 A1 Nov. 20, 2025

(30) Foreign Application Priority Data

May 16, 2024 (KR) ........................ 10-2024-0064100

(51) Int. Cl.
*B60W 50/00* (2006.01)
*B60W 30/02* (2012.01)

(52) U.S. Cl.
CPC ...... *B60W 50/0098* (2013.01); *B60W 30/025* (2013.01); *B60W 2050/0022* (2013.01); *B60W 2520/105* (2013.01); *B60W 2520/12* (2013.01); *B60W 2520/125* (2013.01); *B60W 2520/14* (2013.01); *B60W 2720/10* (2013.01)

(58) Field of Classification Search
CPC ........ B60K 28/00–165; B60W 30/025; B60W 30/12; B60W 30/143; B60W 30/16; B60W 30/162; B60W 30/165; B60W 30/17; B60W 50/0098; B60W 60/0013–00139; B60W 2520/105; B60W 2520/12; B60W 2520/125; B60W 2520/14; B60W 2720/10; G05D 1/0061; G05D 1/0088; G05D 1/021; G05D 1/0214; G05D 1/0221; G05D 1/0223
See application file for complete search history.

(56) References Cited

U.S. PATENT DOCUMENTS 11,794,742 B1 * 10/2023 Belo .................. B60W 30/025

* cited by examiner

*Primary Examiner* — Mark L. Greene
(74) *Attorney, Agent, or Firm* — Lempia Summerfield Katz LLC

(57) ABSTRACT

A vehicle control device includes a sensor that obtains information about a driving environment of a vehicle, a driving device that controls behavior of the vehicle, and a processor that determines a required control quantity for controlling a velocity or acceleration of the vehicle based on the information obtained by the sensor, determines a longitudinal velocity of the vehicle to minimize a tracking error representing a degree to which the vehicle follows the required control quantity while minimizing a total acceleration at a target location within the vehicle, and generates a control signal for controlling the driving device based on the longitudinal velocity of the vehicle.

20 Claims, 12 Drawing Sheets

$q_1 : q_2 : q_3 = 1:3000:1$ $q_1 : q_2 : q_3 = 1:3000:5$ $q_1 : q_2 : q_3 = 1:3000:10$

VEHICLE CONTROL DEVICE AND METHOD

CROSS-REFERENCE TO RELATED APPLICATION

This application claims the benefit of and priority to Korean Patent Application No. 10-2024-0064100, filed in the Korean Intellectual Property Office on May 16, 2024, the entire contents of which are incorporated herein by reference.

TECHNICAL FIELD

The present disclosure relates to a vehicle control device and a vehicle control method, and more particularly, to a driver assistance system for improving ride comfort.

BACKGROUND

To increase the convenience of vehicle drivers and the safety of driving, the development of an advanced driver assistance system (ADAS) is becoming more active. The advanced driving assistance system also controls deceleration and acceleration of the vehicle independently of the driver's operations for the safety of passengers.

The deceleration and acceleration control of the vehicle by the advanced driving assistance system is performed separately from the driver's control related to the operation of the vehicle, which may cause an uncomfortable ride to the driver or passengers.

As user needs for vehicles increasingly focus on ride comfort, a method is needed to improve ride comfort when an advanced driving assistance systems is applied.

The statements in this section merely provide background information related to the present disclosure and may not constitute prior art.

SUMMARY

The present disclosure has been made to solve the above-mentioned problems occurring in the prior art while advantages achieved by the prior art are maintained intact.

An aspect of the present disclosure provides a vehicle control device and a vehicle control method capable of improving the ride comfort of occupants in a vehicle using a driving assistance system.

An aspect of the present disclosure provides a vehicle control device and a vehicle control method capable of further improving ride comfort at an occupant's riding position.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a vehicle control device includes: a sensor that obtains information about a driving environment of a vehicle, a driving device that controls behavior of the vehicle, and a processor that determines a required control quantity for controlling a velocity or acceleration of the vehicle based on the information obtained by the sensor, determines a longitudinal velocity of the vehicle to minimize a tracking error representing a degree to which the vehicle follows the required control quantity while minimizing a total acceleration at a target location within the vehicle, and generates a control signal for controlling the driving device based on the longitudinal velocity of the vehicle.

According to an embodiment, the processor may determine a longitudinal acceleration at the target location, considering a rotational motion around a center of gravity of the vehicle; determine a lateral acceleration at the target location, considering a rotational motion around the center of gravity of the vehicle; and determine the longitudinal velocity of the vehicle to minimize the longitudinal acceleration and the lateral acceleration.

According to an embodiment, the processor may determine the longitudinal acceleration at the target location based on the longitudinal acceleration of the vehicle, a lateral velocity of the vehicle, a yaw angular acceleration, a lateral distance between the center of gravity of the vehicle and the target location, a longitudinal distance between the center of gravity of the vehicle and the target location, and a yaw rate.

According to an embodiment, the processor may determine the lateral acceleration at the target location based on the lateral acceleration of the vehicle, the longitudinal velocity of the vehicle, a yaw angular acceleration, a longitudinal distance between the center of gravity of the vehicle and the target location, a lateral distance between the center of gravity of the vehicle and the target location, and a yaw rate.

According to an embodiment, the processor may set a target lateral velocity at the target location to zero.

According to an embodiment, the processor may apply a first weight to the longitudinal acceleration at the target location in the vehicle, a second weight to the lateral acceleration at the target location in the vehicle, and a third weight to the tracking error that follows the required control quantity.

According to an embodiment, the processor may set a magnitude of the third weight to be larger as an expected collision time related to objects around the vehicle is shorter.

According to an embodiment, the processor may set a magnitude of the third weight to be larger as a lateral behavior of the vehicle is smaller.

According to an embodiment, the processor may determine a required velocity based on the driving environment, and determine the tracking error based on a difference between the required velocity and the longitudinal velocity of the vehicle.

According to an embodiment, the processor may determine a required acceleration based on the driving environment, and determine the tracking error based on a difference between the required acceleration and the longitudinal acceleration of the vehicle.

According to an aspect of the present disclosure, a vehicle control method includes: determining a required control quantity for controlling a velocity or acceleration of a vehicle based on information about a driving environment of the vehicle, determining a longitudinal velocity of the vehicle to minimize a tracking error representing a degree of following the required control quantity while minimizing a total acceleration at a target location within the vehicle, and generating a control signal for controlling a driving device of the vehicle based on the longitudinal velocity.

According to an embodiment, the determining of the longitudinal velocity of the vehicle may include: determining a longitudinal acceleration at the target location, considering a rotational motion around a center of gravity of the vehicle; determining a lateral acceleration at the target location, considering a rotational motion around the center of gravity of the vehicle; and determining the longitudinal velocity of the vehicle to minimize the longitudinal acceleration and the lateral acceleration.

According to an embodiment, the determining of the longitudinal acceleration at the target location may include: using the longitudinal acceleration of the vehicle, a lateral velocity of the vehicle, a yaw angular acceleration, a lateral distance between the center of gravity of the vehicle and the target location, a longitudinal distance between the center of gravity of the vehicle and the target location, and a yaw rate.

According to an embodiment, the determining of the lateral acceleration at the target location may include: using the lateral acceleration of the vehicle, the longitudinal velocity of the vehicle, a yaw angular acceleration, a longitudinal distance between the center of gravity of the vehicle and the target location, a lateral distance between the center of gravity of the vehicle and the target location, and a yaw rate.

According to an embodiment, the determining of the lateral acceleration at the target location may include setting a target lateral velocity at the target location to zero.

According to an embodiment, the determining of the longitudinal velocity of the vehicle may include: applying a first weight to the longitudinal acceleration at the target location in the vehicle; applying a second weight to the lateral acceleration at the target location in the vehicle; and applying a third weight to the tracking error that follows the required control quantity.

According to an embodiment, the applying of the third weight may include: determining an expected collision time related to objects around the vehicle, and setting a magnitude of the third weight to be larger as the expected collision time is shorter.

According to an embodiment, the applying of the third weight may include determining a lateral behavior of the vehicle, and setting a magnitude of the third weight to be larger as the lateral behavior of the vehicle is smaller.

According to an embodiment, the determining of the longitudinal velocity of the vehicle may include: determining a required velocity based on the driving environment, and determining the tracking error based on a difference between the required velocity and the longitudinal velocity of the vehicle.

According to an embodiment, the determining of the longitudinal velocity of the vehicle may include: determining a required acceleration based on the driving environment, and determining the tracking error based on a difference between the required acceleration and the longitudinal acceleration of the vehicle.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
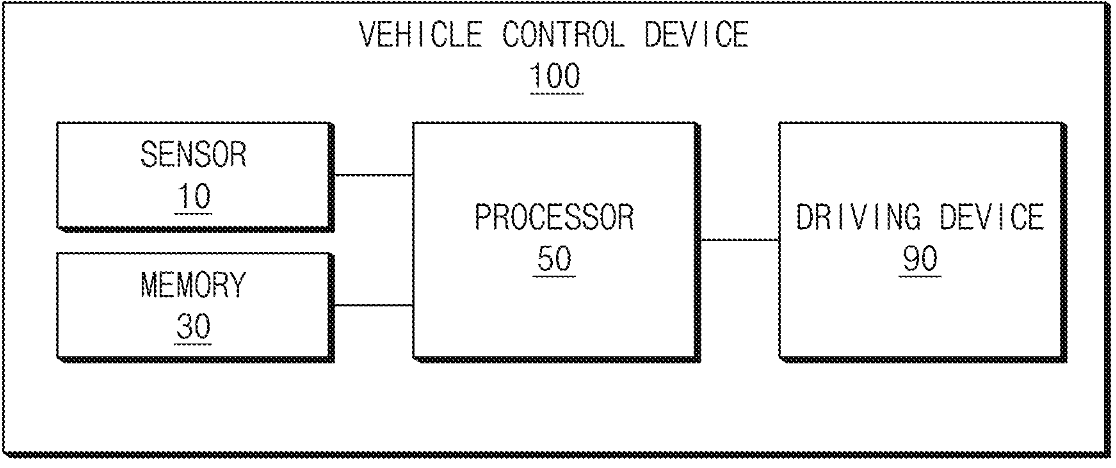
FIG. 1 is a diagram illustrating a configuration of a vehicle control device according to an embodiment of the present disclosure.

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions are ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible combinations of the items listed together in the corresponding one of the phrases.

Hereinafter, embodiments of the present disclosure are described in detail with reference to FIGS. 1 to 12.

FIG. 1 is a diagram illustrating a configuration of a vehicle control device according to an embodiment of the present disclosure.

Referring to FIG. 1, a vehicle control device 100 according to an embodiment of the present disclosure may be mounted on a vehicle to assist driving the vehicle. The vehicle control device 100 may include a sensor 10, a memory 30, a processor 50, and a driving device 90.

The sensor 10 may detect the driving state of the vehicle and the driving environment of the vehicle, and may include a plurality of sensors.

The sensor 10 may include a brake pedal position sensor (BPS) and an accelerator pedal position sensor (APS), which generate a velocity control command for shifting gears of the vehicle.

The brake pedal position sensor may output a BPS signal according to the degree of depression on a brake pedal provided in the vehicle. As an example, the BPS signal may indicate data in a range of 0 to 100 according to the degree of depression on the brake pedal, a value of 0 may indicate a case where the brake pedal is not depressed, and a value of 100 may indicate a case where the brake pedal is maximally depressed.

The accelerator pedal position sensor may output an APS signal according to the degree of depression on an accelerator pedal provided in the vehicle. As an example, the APS signal may indicate data in a range of 0 to 100 according to the degree of depression on the accelerator pedal. A value of 0 may indicate a case where the accelerator pedal is not depressed, and a value of 100 may indicate a case where the accelerator pedal is maximally depressed.

In addition, the sensor 10 may include a steering angle sensor for detecting the steering angle of a steering wheel, a yaw rate sensor for detecting yaw movement of the vehicle, a lateral acceleration sensor for detecting the lateral acceleration of the vehicle, and a longitudinal acceleration sensor for detecting the longitudinal acceleration of the vehicle, and a wheel velocity sensor for determining a vehicle velocity (i.e., the velocity of the vehicle).

In addition, the sensor 10 may include at least one of a camera, a Radio Detection and Ranging (RADAR), a Light Imaging Detection and Ranging (LIDAR), an ultrasonic sensor, or an infrared sensor, that detect external objects of the vehicle, especially vehicles located in the front or rear of the vehicle (e.g., any vehicles, persons and objects surrounding the vehicle).

The camera may be positioned at an appropriate location outside the vehicle, for example, in the front portion, rear portion, right side mirror, or left side mirror of the vehicle to obtain an image outside the vehicle. The camera may be a mono camera, a stereo camera, an Around View Monitoring (AVM) camera, or a 360-degree camera.

The camera may be placed close to the front windshield in the cabin of the vehicle, and around the front bumper or radiator grill to obtain an image in front of the vehicle.

The camera may be positioned close to at least one of the side windows in the cabin of the vehicle to obtain an image on the side of the vehicle. Also, the camera may be positioned around a fender or door.

The RADAR may include an electromagnetic wave transmission module and a reception module. The RADAR may be implemented in a pulse radar method or a continuous wave radar method based on the principle of transmitting radio waves. The RADAR may be implemented in the FMCW (Frequency Modulated Continuous Wave) method or FSK (Frequency Shift Keying) method depending on signal waveforms, among the continuous wave radar methods. The RADAR may detect an object and determine the position of the detected object, and the distance and relative velocity to the detected object, via electromagnetic waves, based on the TOF (Time of Flight) method or phase-shift method.

The LIDAR may include a laser transmission module and a reception module. The LIDAR may be implemented in a Time of Flight (TOF) method or a phase-shift method. The LIDAR may be exposed to the outside of the vehicle to detect an object located in front, rear or side of the vehicle.

The ultrasonic sensor may include an ultrasonic transmitting module and an ultrasonic receiving module. The ultrasonic sensor may detect an object based on ultrasonic waves and determine the location of the detected object, and the distance and relative velocity to the detected object. The ultrasonic sensor may be placed at an appropriate location on the exterior of the vehicle to detect objects located in the front, rear, or sides of the vehicle.

The infrared sensor may include an infrared transmitting module and an infrared receiving module. The infrared sensor may detect an object based on infrared light, and determine the location of the detected object, and the distance and relative velocity to the detected object. The infrared sensor may be placed on the exterior of the vehicle to detect objects located in front, rear, or sides of the vehicle.

The memory 30 may store an algorithm and an AI processor for the operation of the processor 50. The memory 30 may be implemented using a hard disk drive, flash memory, electrically erasable programmable read-only memory (EEPROM), static RAM (SRAM), ferro-electric RAM (FRAM), phase-change RAM (PRAM), magnetic RAM (MRAM), Dynamic Random Access (DRAM), Synchronous Dynamic Random Access Memory (SDRAM), Double Data Rate-SDRAM (DDR-SDRAM), and the like.

The processor 50 may determine a surrounding environment of the vehicle based on information acquired by the sensor 10 and determine a required control quantity for controlling the driving control device based on the surrounding environment. The surrounding environment may be other vehicles, two-wheelers, or obstacles. Additionally, the surrounding environment may be traffic guidance facilities such as lines, traffic lights, and crosswalk traffic signs.

When a risk of collision with another object or a vehicle is detected based on the obtained surrounding environment information, the processor 50 may determine a required control quantity to control or decelerate the vehicle. The required control quantity may be a degree of required velocity or a degree of required acceleration to control the vehicle. The required control quantity referred to in the embodiment of the present disclosures may be determined based on a predetermined algorithm using the information acquired by the sensor 10, and may be distinguished from a signal generated when the user operates an accelerator, a brake, or the like.

The processor 50 may determine a target velocity for the vehicle so as to reduce the vehicle velocity according to the required control quantity and improve riding comfort at a specific location. The target velocity may include a longitudinal velocity in the direction of travel of the vehicle.

The processor 50 may determine the target velocity of the vehicle such that a tracking error, which indicates the degree of following the total acceleration and the required control quantity, is minimized.

The total acceleration may include a longitudinal acceleration at a target location and a lateral acceleration at the target location. The target location may be a location where the effect of acceleration is desired to be excluded, and may be set based on the location of a passenger or the location of a luggage in the vehicle. For example, the target location may be the seat location of a passenger. When there are two or more passengers, the target location may be specified as any one seat location according to preset criteria. Alternatively, the target location may be a location where a luggage is placed in the vehicle.

The tracking error may be the difference between a required velocity and the target velocity of the vehicle. Alternatively, the tracking error may be the difference between a required acceleration and the target acceleration of the vehicle.

The processor 50 may apply a first weight to the longitudinal acceleration at the target location, a second weight to the lateral acceleration at the target location, and a third weight to the tracking error.

The processor 50 may use an objective function stored in the memory 30 to determine the target velocity of the vehicle. The objective function may be a function including the longitudinal acceleration of the vehicle, the lateral acceleration of the vehicle, and the tracking error, and the processor 50 may determine the target velocity of the vehicle to minimize the value of the objective function.

Additionally, the processor 50 may generate a control signal for controlling the driving device 90 based on the target velocity. The driving device 90 may include a wheel, an engine, a brake, or the like in the vehicle. The control signal may include a steering control signal that controls the front wheel steering angle or rear wheel steering angle of the vehicle. In addition, the control signal may include a torque control signal that determines the driving torque of the engine. Furthermore, the control signal may include a braking control signal that determines a braking pressure for decelerating the vehicle.

In an embodiment of the present disclosure, a process of determining the required control quantity may be performed by a driving assistance device such as an advanced driver assistance system (ADAS). For example, when the deceleration of the vehicle is determined by the driving assistance device, the processor 50 may perform a process of determining a longitudinal velocity to minimize the longitudinal acceleration, lateral acceleration, and tracking error at a specific location in the vehicle.

Additionally, in an embodiment of the present disclosure, a process of generating a control signal may be performed by the vehicle controller. The vehicle controller may control the driving device 90 and may include a steering controller, an engine controller, a braking controller, a transmission controller, and/or the like of the vehicle.

The engine controller may generate control signals for an actuator that controls the engine of the vehicle, and may be implemented with an EMS (Engine Management System).

The braking controller may generate a control signal for an actuator that controls deceleration of the vehicle, and may be implemented with an Electronic Stability Control (ESC).

The transmission controller may generate a control signal for an actuator that controls the transmission of the vehicle, and may be implemented with a Shift By Wire (SBW).

Figure 2:
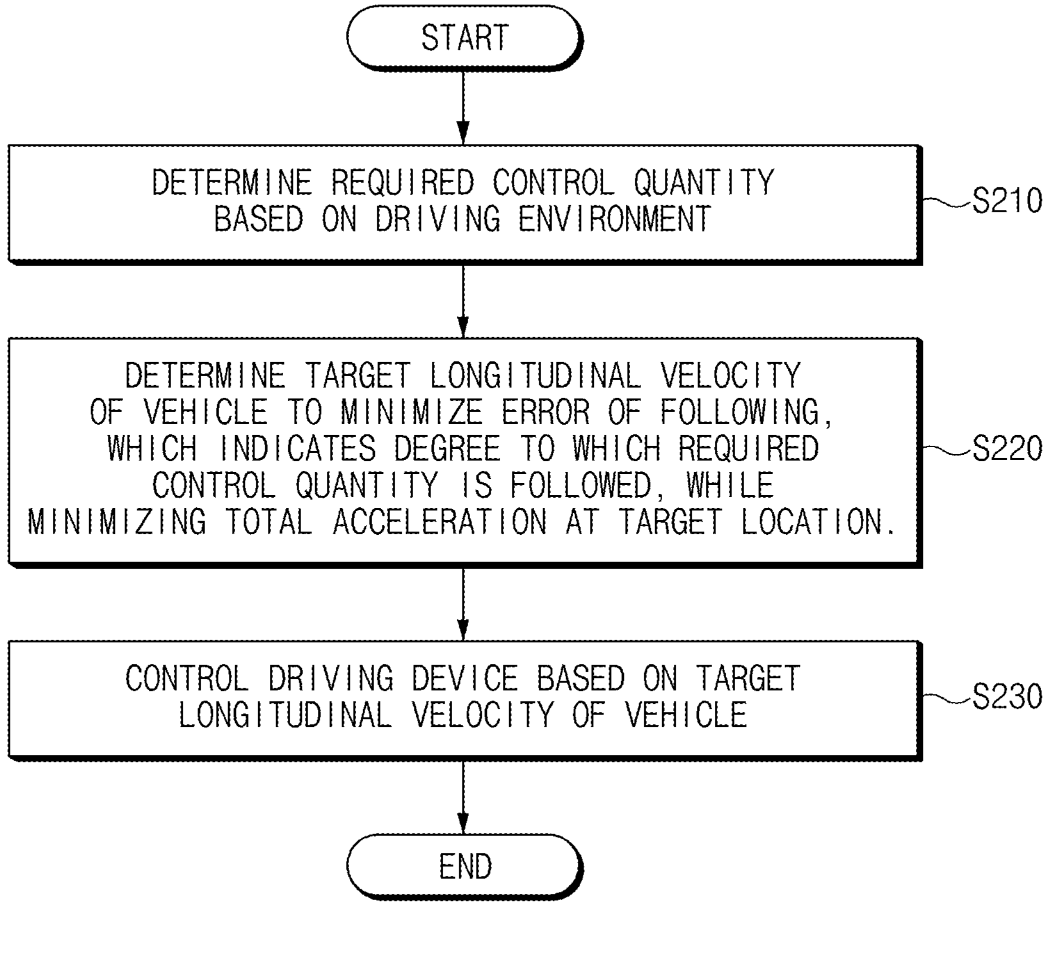
FIG. 2 is a flowchart for describing a vehicle control method according to an embodiment of the present disclosure.

FIG. 2 is a flowchart for describing a vehicle control method according to an embodiment of the present disclosure. The processes shown in FIG. 2 may be controlled by the processor shown in FIG. 1.

Referring to FIG. 2, a vehicle control method according to an embodiment of the present disclosure is described below.

In an operation S210, the processor 50 may determine a required control quantity based on the driving environment information of a vehicle.

In an operation S220, the processor 50 may determine a velocity of the vehicle to minimize a total acceleration and a tracking error at a target location in the vehicle.

The total acceleration may include a longitudinal acceleration of the vehicle at the target location and a lateral acceleration of the vehicle at the target location.

The tracking error may indicate the degree to which the vehicle follows the required control quantity. The tracking error may be the deviation between the required velocity and the current velocity of the vehicle. Alternatively, the tracking error may be the deviation between a required acceleration and the current acceleration of the vehicle.

In an operation S230, the processor 50 may generate a control signal for controlling the driving device of the vehicle based on the longitudinal velocity of the vehicle.

Hereinafter, a vehicle control method according to an embodiment of the present disclosure is described in detail below.

Figure 3:
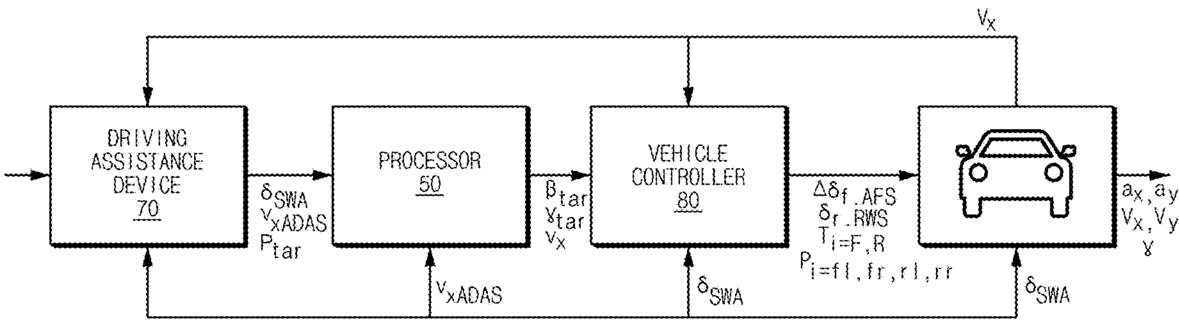
FIG. 3 is a diagram for describing a method for following a required velocity according to an embodiment of the present disclosure.

FIG. 3 is a diagram for describing a method for following a required velocity according to an embodiment of the present disclosure. FIG. 3 may illustrate an embodiment of the present disclosure applied to a vehicle including a driving assistance device and a vehicle controller of the vehicle.

Referring to FIG. 3, a method for following a required velocity according to another embodiment of the present disclosure is described below.

The driving assistance device 70 may generate a steering control signal ($\delta_{SWA}$), a required velocity ($v_{x.ADAS}$), and a target curvature ($\rho_{tar}$) based on a driving environment information of the vehicle.

The steering control signal ($\delta_{SWA}$) may be intended to determine the steering angle of a steering wheel of the vehicle. The required velocity ($v_{x.ADAS}$) may be intended to determine the longitudinal velocity of the vehicle. The target curvature ($\rho_{tar}$) may be intended to avoid or prevent the vehicle from making a sharp turn, and the vehicle may be controlled to turn within the range of the target curvature ($\rho_{tar}$).

The processor 50 may determine a target lateral slip angle ($\beta_{tar}$), a target yaw rate ($\gamma_{tar}$), and a target longitudinal velocity ($V_x$) based on signals output by the driving assistance device 70.

The processor 50 may determine the longitudinal velocity of the vehicle such that a total acceleration and a tracking error with respect to a target location is minimized.

A vehicle controller 80 may generate a control signal for controlling the driving device 90 of the vehicle based on the signals output by the processor 50 and the steering control signal ($\delta_{SWA}$).

The method of minimizing the total acceleration and the tracking error for the longitudinal velocity at a target location according to an embodiment of the present disclosure may use a preset objective function. The objective function may include a first objective function set to minimize the total acceleration and longitudinal acceleration tracking error and a second objective function set to minimize the total acceleration and longitudinal velocity tracking error. The processor 50 may determine the velocity or acceleration of the vehicle by selectively using the first objective function or the second objective function.

The first objective function may be expressed by the longitudinal acceleration at the target location, the lateral acceleration at the target location, and the tracking error, as shown in Equation 1 below.

$$J1 = q_1(a_{x\cdot A})^2 + q_2(a_{y\cdot A})^2 + q3(\dot{V}_{x\cdot ADAS} - \dot{V}_x)^2 \qquad \text{[Equation 1]}$$

In [Equation 1], $a_{x.A}$ may denote the longitudinal acceleration at the target location, and $a_{y.A}$ may denote the lateral acceleration at the target location.

[Equation 1] may be modified based on the relationship between the center of gravity of the vehicle and the acceleration at the target location.

Figure 4:
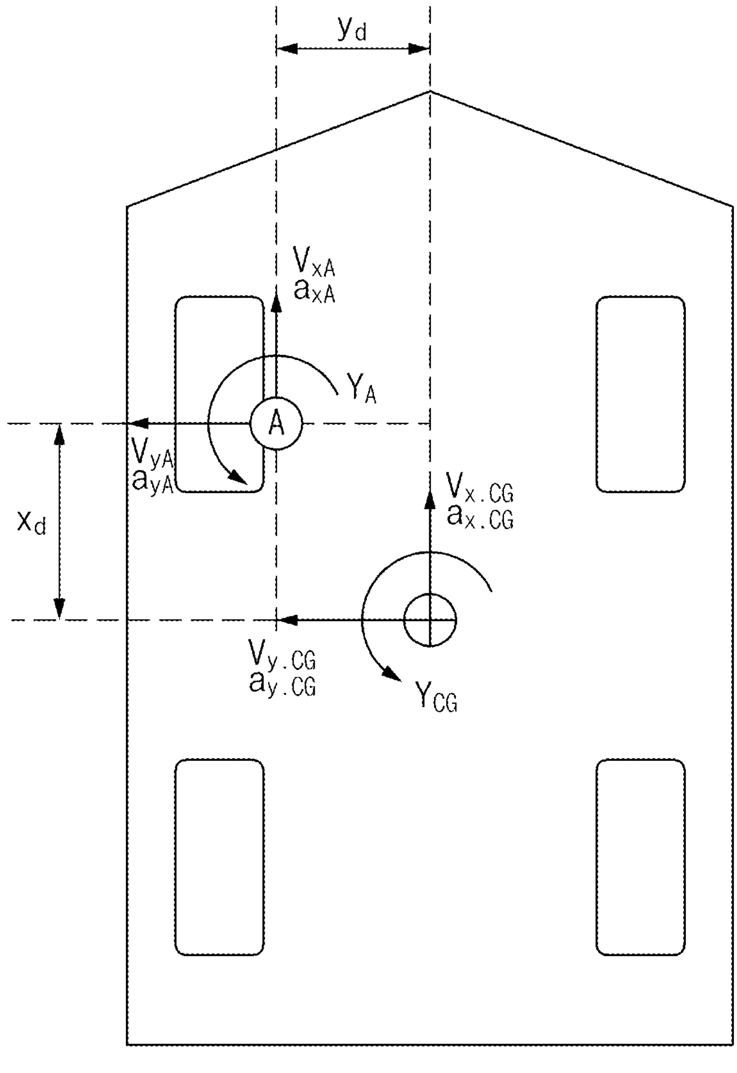
FIG. 4 is a diagram for describing a relationship between the center of gravity of a vehicle and an acceleration at a target location.

FIG. 4 is a diagram for describing a relationship between the center of gravity of a vehicle and an acceleration at a target location.

Referring to FIG. 4, the longitudinal acceleration at the target location and the longitudinal acceleration at the center of gravity may be expressed as $a_{x.A}=a_{x.CG}-x_d\gamma^2-y_d\dot{\gamma}$, where, $a_{x.A}$ may denote the longitudinal acceleration considering rotational motion at the target location, $x_d$ may denote the longitudinal distance between the center of gravity (CG) and the target location (A), $y_d$ may be the lateral distance between the center of gravity (CG) and the target location (A). $\gamma$ may denote the yaw rate of the vehicle, and $\dot{\gamma}$ may denote the yaw angular acceleration of the vehicle and may be a differential value of the yaw rate.

Further, the longitudinal acceleration ($a_{x.CG}$) at the center of gravity considering rotational motion may be expressed as $a_{x.CG}=\dot{V}_{x.CG}-V_{y.CG}\gamma$, where $\dot{V}_{x.CG}$ may denote the longitudinal acceleration considering only translational motion at the center of gravity, $V_{y.CG}$ may denote the lateral velocity at the center of gravity, and $\gamma$ may denote the yaw rate of the vehicle.

Therefore, the longitudinal acceleration at the target location may be expressed as $a_{x.A}=a_{x.CG}-x_d\gamma^2-y_d\dot{\gamma}=\dot{V}_{x.CG}-V_{y.CG}\gamma-x_d\gamma^2-\gamma_d\dot{\gamma}$.

Similarly, the lateral acceleration at the target location and the lateral acceleration at the center of gravity may be expressed as $a_{y.A}=a_{x.CG}-x_d\dot{\gamma}-y_d\gamma^2$, where $a_{y.A}$ may denote the lateral acceleration considering rotational motion at the target location.

The lateral acceleration ($a_{y.CG}$) considering rotational motion at the center of gravity may be expressed as $a_{y.CG}=\dot{V}_{y.CG}+V_{x.CG}\gamma$, where $\dot{V}_{y.CG}$ may denote the lateral acceleration considering only translational motion at the center of gravity, and $V_{x.CG}$ may denote the longitudinal acceleration at the center of gravity.

Therefore, the lateral acceleration at the target location may be expressed as $a_{y.A}=a_{x.CG}+x_d\dot{\gamma}-y_d\gamma^2=\dot{V}_{y.CG}+V_{x.CG}\gamma+x_d\dot{\gamma}-y_d\gamma^2$.

As a result, the first objective function (J1) expressed in [Equation 1] using the acceleration relationship between the center of gravity of the vehicle and the target location may be expressed in [Equation 2] as follows. Hereinafter, $V_{x.CG}$ expressed in [Equation 1] may be denoted as $V_x$, $\dot{V}_{x.CG}$ may be denoted as $\dot{V}_x$, $V_{y.CG}$ may be denoted as $V_y$, and $\dot{V}_{y.CG}$ may be denoted as $\dot{V}_y$.

$$J1 = q_1(\dot{V}_x - V_y\gamma - y_d\dot{\gamma} - x_d\gamma^2)^2 + q_2(\dot{V}_y + V_x\gamma + x_d\dot{\gamma} - y_d\gamma^2)^2 + q_3(\dot{V}_{x\cdot ADAS} - V_x)^2 \quad \text{[Equation 2]}$$

In [Equation 2], $\dot{V}_{x.ADAS}$ may be the required acceleration, $q_1$ may be a first weight, $q_2$ may be a second weight, and $q_3$ may be a third weight.

In [Equation 2], $(\dot{V}_x-V_y\gamma-y_d\dot{\gamma}-x_d\gamma^2)$ may denote the longitudinal acceleration at the target location, $(\dot{V}_y+V_x\gamma+x_d\dot{\gamma}-y_d\gamma^2)$ may denote the lateral acceleration at the target location, and $(\dot{V}_{x.ADAS}-V_x)$ may denote the tracking error between the required acceleration and the longitudinal acceleration of the vehicle.

The longitudinal velocity of the vehicle may be determined as a value capable of minimizing the first objective function described in [Equation 2].

Figure 5:
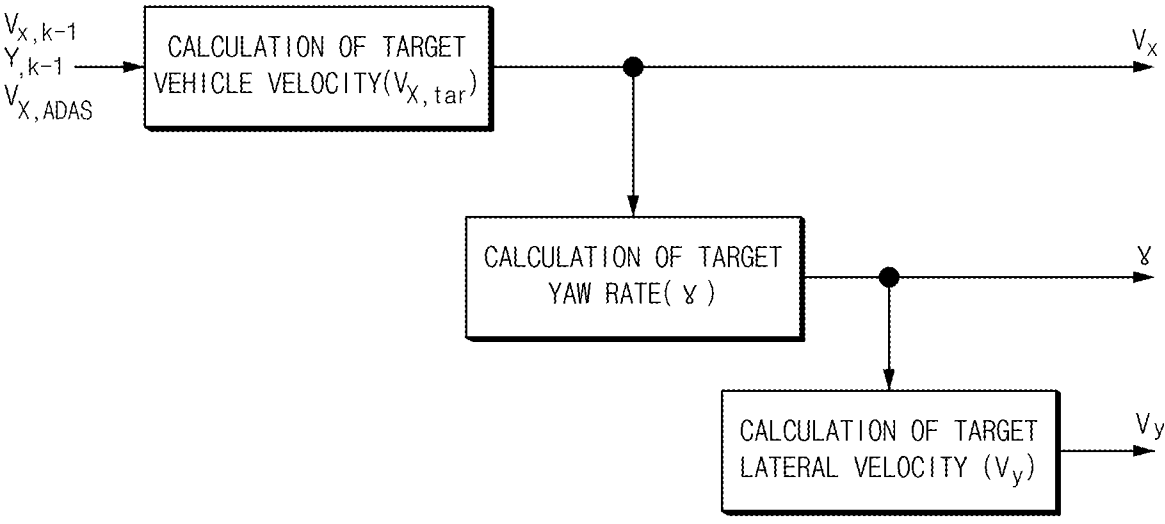
FIG. 5 is a diagram illustrating a method for determining a target longitudinal velocity, a target yaw rate, and a target lateral velocity of a vehicle according to an embodiment of the present disclosure.

FIG. 5 is a diagram illustrating a method for determining a target longitudinal velocity, a target yaw rate, and a target lateral velocity of a vehicle according to an embodiment of the present disclosure.

Based on FIG. 5 and [Equation 2], the method of deriving the longitudinal velocity of a vehicle to minimize the objective function is described below.

To reduce the lateral slip angle of the vehicle, the target lateral velocity may be set to zero "0". Additionally, the square of the yaw rate of the objective function ($\gamma^2$) may be simplified to zero "0". In [Equation 2], when the lateral velocity at the target location is set to 0 (zero) and the square of the yaw rate ($\gamma^2$) is simplified to 0 (zero), the first objective function (J1) of [Equation 2] may be expressed as [Equation 3] below.

$$J1 = q_1(\dot{V}_x - y_d\dot{\gamma})^2 + q_2(V_x\gamma)^2 + q_3(\dot{V}_{x\cdot ADAS} - \dot{V}_x)^2 \quad \text{[Equation 3]}$$

When partial differentiation is performed on [Equation 3], it may be expressed as [Equation 4].

$$\frac{\partial J}{\partial V_x} = \frac{2q_1}{T_s}\left(\frac{v_{x\cdot k} - v_{x\cdot k-1}}{T_s} - y_d\dot{\gamma}_{k-1}\right) + 2q_2\left(V_{x\cdot k}\gamma_k^2 + V_{x\cdot k}^2\gamma_k\frac{\partial \gamma}{\partial V_x}\right) - \frac{2q_3}{T_s}\left(\dot{V}_{x\cdot ADAS} - \frac{V_{x\cdot k} - V_{x\cdot k-1}}{T_s}\right) = 0 \quad \text{[Equation 4]}$$

In [Equation 4], when the lateral velocity ($V_y$) is zero "0", $$\frac{\partial \gamma}{\partial V_x}$$

may be approximated by curvature (ρ), and the curvature (ρ) may be replaced by $$\frac{\gamma}{V_x}.$$

Therefore, [Equation 4] may be expressed as [Equation 5].

$$\frac{\partial J}{\partial V_x} = \frac{2q_1}{T_s}\left(\frac{v_{x\cdot k} - v_{x\cdot k-1}}{T_s} - y_d\dot{\gamma}_{k-1}\right) + 2q_2(2V_{x\cdot k}\gamma_k^2) - \frac{2q_3}{T_s}\left(\dot{V}_{x\cdot ADAS} - \frac{V_{x\cdot k} - V_{x\cdot k-1}}{T_s}\right) = 0 \quad \text{[Equation 5]}$$

In [Equation 5], $V_{x.k}$ may be the longitudinal velocity of the k-th vehicle, and $V_{x.k-1}$ may be the target longitudinal velocity of the (k−1)-th vehicle. $T_s$ may be a sampling time, and may be the interval between the timing at which the target longitudinal velocity of the (k−1)-th vehicle is calculated and the timing at which the target longitudinal velocity of the k-th vehicle is calculated.

Based on [Equation 5], the longitudinal velocity of vehicle ($V_{x.k}$) may be calculated as $$V_{x\cdot k} = \frac{\frac{q_1}{T_s^2}V_{x\cdot k-1} + \frac{q_1 y_d}{T_s}\dot{\gamma}_{k-1} + \frac{q_3}{T_s}\left(\dot{V}_{x\cdot ADAS} + \frac{V_{x\cdot k-1}}{T_s}\right)}{\frac{q_1}{T_s^2} + 2q_2\gamma_{k-1}^2 + \frac{q_3}{T_s^2}}.$$

The above-described [Equation 1] to [Equation 5] may be intended to explain a method of determining the longitudinal velocity of the vehicle based on the first objective function. As described above, the first objective function J1 may be intended to consider performance of following the required acceleration output by the driving assistance device 70.

According to another embodiment of the present disclosure, the longitudinal velocity of the vehicle may be determined based on the performance of following the required velocity output by the driving assistance device 70.

The second objective function (J2) as shown in [Equation 6] below may be set to a function capable of minimizing the difference between the required velocity ($V_{x.ADAS}$) and the longitudinal velocity of the vehicle ($V_x$).

$$J2 = q_1(\dot{V}_x - V_y\gamma - y_d\dot{\gamma} - x_d\gamma^2)^2 + q_2(\dot{V}_y + V_x\gamma + x_d\dot{\gamma} - y_d\gamma^2)^2 + q_3(V_{x\cdot ADAS} - V_x)^2 \quad \text{[Equation 6]}$$

Similarly to the first objective function (J1), the second objective function (J2) may be expressed as a longitudinal acceleration at the target location, a lateral acceleration at the target location, and a tracking error. The longitudinal acceleration at the target location and the lateral acceleration at the target location may be expressed in the same way as the first objective function (J1). The tracking error may denote the difference between the required velocity ($V_{x.ADAS}$) and the longitudinal velocity of the vehicle ($V_x$).

The processor 50 may determine the longitudinal velocity of the vehicle ($V_x$) to minimize the magnitude of the second objective function (J2). The processor 50 may obtain the differential solution of the second objective function (J2) similarly to a method of minimizing the size of the first objective function (J1). As a result, the longitudinal velocity of the vehicle ($V_x$) obtained using the second objective function (J2) may be expressed as [Equation 7] below.

$$V_{x\cdot k} = \frac{\frac{q_1}{T_s^2}V_{x\cdot k-1} + \frac{q_1 y_d}{T_s}\dot{\gamma}_{k-1} + \frac{q_3}{T_s}\left(\dot{V}_{x\cdot ADAS} + \frac{V_{x\cdot k-1}}{T_s}\right)}{\frac{q_1}{T_s^2} + 2q_2\gamma_{k-1}^2 + \frac{q_3}{T_s^2}} \quad \text{[Equation 7]}$$

The processor 50 may determine the target yaw rate in addition to the longitudinal velocity of the vehicle ($V_x$). The target yaw rate may be determined such that the vehicle is able to drive while following the target curvature.

Figure 6:
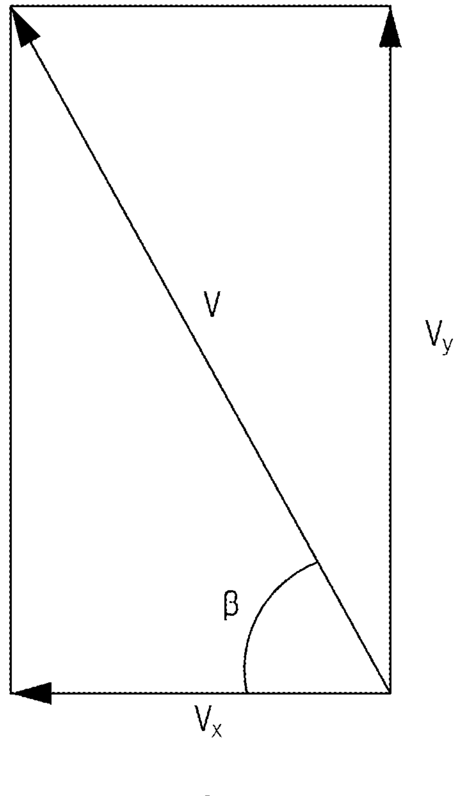
FIG. 6 is a diagram for describing a method of calculating a target yaw rate.

FIG. 6 is a diagram for describing a method of calculating a target yaw rate.

Referring to FIG. 6, the lateral slip angle (β) may be expressed as a value obtained by dividing the longitudinal velocity ($V_x$) by the lateral velocity ($V_y$) as shown in [Equation 8].

$$\rho = \frac{(\gamma V_x + \dot{V}_y)\cos\beta - (\dot{V}_x - \gamma V_y)\sin\beta}{V_x^2 + V_y^2} \quad \text{[Equation 8]}$$

In [Equation 8], ρ may be the target curvature determined by the driving assistance device 70 based on the driving situation of the vehicle. In other words, the processor 50 may perform control such that the vehicle drives based on the target curvature (p).

As shown in FIG. 6, because $$\cos\beta = \frac{V_x}{V} \text{ and } \sin\beta = \frac{V_y}{V}$$

are expressed, [Equation 8] may be expressed as [Equation 9] below.

$$\rho = \frac{(\gamma V_x + \dot{V}_y)\frac{V_x}{V}(\dot{V}_x - \gamma V_y)\frac{V_y}{V}}{V^2} \quad \text{[Equation 9]}$$

To summarize [Equation 9], the yaw rate (γ) may be expressed as [Equation 10] below.

$$\gamma = \frac{-V_x\dot{V}_y + \dot{V}_x V_y + \rho V^3}{V^2} \quad \text{[Equation 10]}$$

Embodiments of the present disclosure may aim to maintain zero as the lateral velocity at the target location. Therefore, the lateral velocity ($V_y$) of the vehicle may be expressed as $V_y = -x_d\gamma$, and accordingly, [Equation 10] maybe expressed as [Equation 11] below.

$$\gamma = \frac{\rho V^3}{V^2 + \dot{V}_x x_d} \quad \text{[Equation 11]}$$

In [Equation 11], the velocity of the vehicle (V) may be expressed as the sum of the longitudinal velocity of the vehicle ($V_x$) and the lateral velocity of the vehicle ($V_y$), as shown in FIG. 6. Additionally, the longitudinal velocity of the vehicle ($V_x$) may denote the longitudinal velocity at the center of gravity of the vehicle, and may be obtained based on the first objective function (J1) or the second objective function (J2).

The first weight (q1), second weight (q2), and third weight (q3) of the first objective function (J1) and the second objective function (J2) may vary depending on driving environments or driving conditions.

Figure 7:
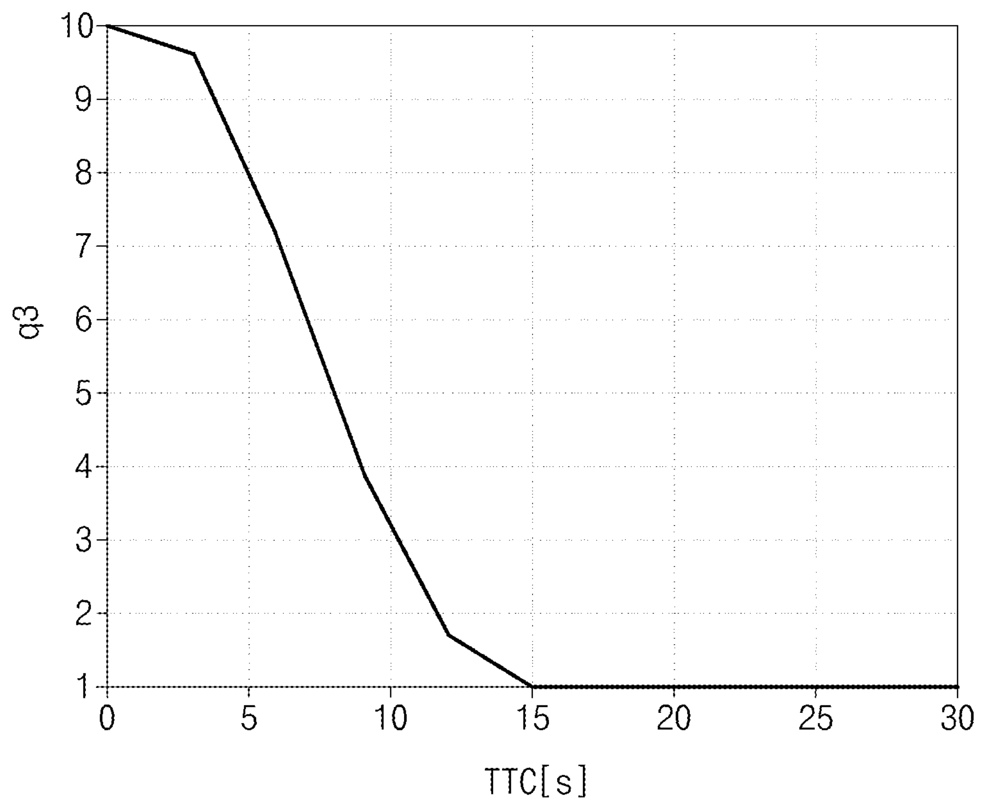
FIG. 7 is a diagram for describing a method of determining the magnitude of a third weight.

FIG. 7 is a diagram for describing a method of determining the magnitude of a third weight.

Referring to FIG. 7, the third weight may be set differently depending on an expected collision time.

The third weight may be used to determine the degree to which tracking error is reflected in the process of determining a target longitudinal velocity.

A process of reflecting the third weight may include a process of determining an expected collision time related to objects around the vehicle. The processor 50 may determine whether a collision with another vehicle or obstacle is expected based on driving environment information obtained by a sensor.

The processor 50 may determine an expected collision time when a collision with an object around the vehicle is expected. When the longitudinal velocity of the vehicle relative to the object is a negative value, the expected collision time may be a preset default value. When the longitudinal velocity of the vehicle relative to the object is a positive value, i.e. the vehicle is faster than the object, the expected collision time may be determined to be a value smaller than the default value. The expected collision time may be determined to be proportional to the relative distance between the object and the vehicle, and to be inversely proportional to the relative velocity of the vehicle.

The processor 50 may set the magnitude of the third weight to be larger as the expected collision time is shorter. The larger the third weight, the higher the performance of following the longitudinal control output by the driving assistance device 70. In other words, the processor 50 may set the magnitude of the third weight to be larger to increase safety as the expected collision time is shorter.

The processor 50 may reduce the magnitude of the third weight to improve riding comfort as the expected collision time is longer.

Figure 8:
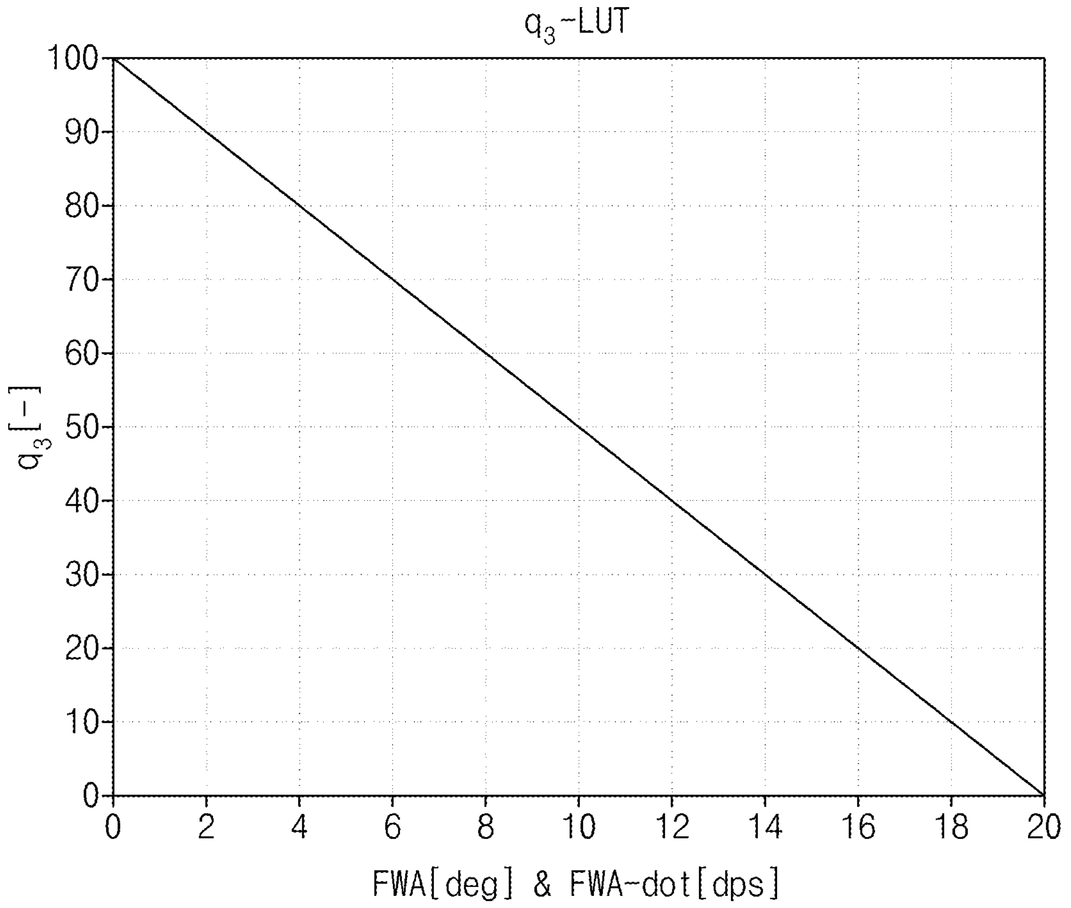
FIG. 8 is a diagram for describing a method of determining the magnitude of a third weight according to another embodiment.

FIG. 8 is a diagram for describing a method of determining the magnitude of a third weight according to another embodiment.

Referring to FIG. 8, the third weight may vary depending on the lateral behavior of a vehicle.

The lateral behavior of the vehicle may be determined based on a tire wheel angle. For example, the lateral behavior of the vehicle may be determined based on a front tire wheel angle (FWA).

The processor 50 may set the magnitude of the third weight to be larger as the front tire wheel angle (FWA) is smaller.

Because a state in which the lateral behavior is small may be determined as a situation in which the vehicle is driving straight, the processor 50 may set the magnitude of the third weight to be large to increase performance of following the longitudinal velocity when the lateral behavior is small.

Figure 9:
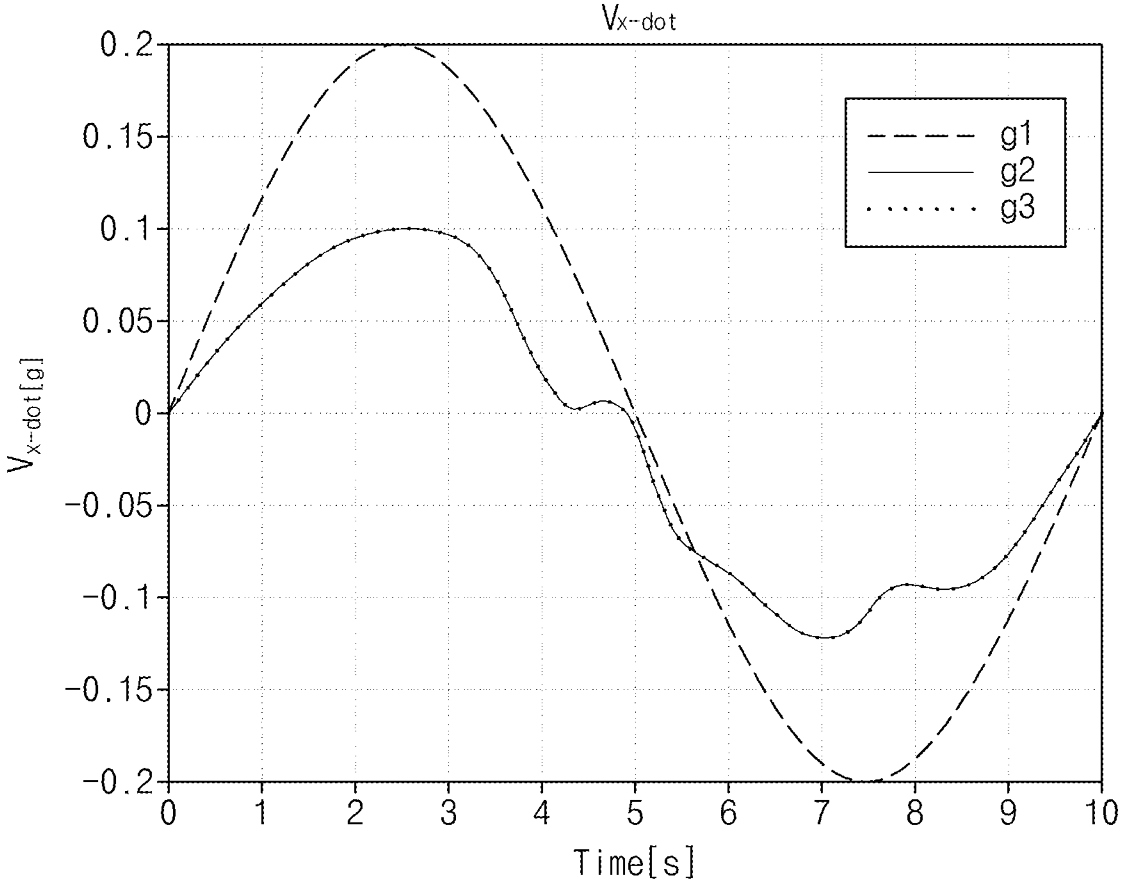
FIGS. 9 to 11 are diagrams showing simulation results for performance of following a longitudinal velocity according to an embodiment of the present disclosure.
Figure 10:
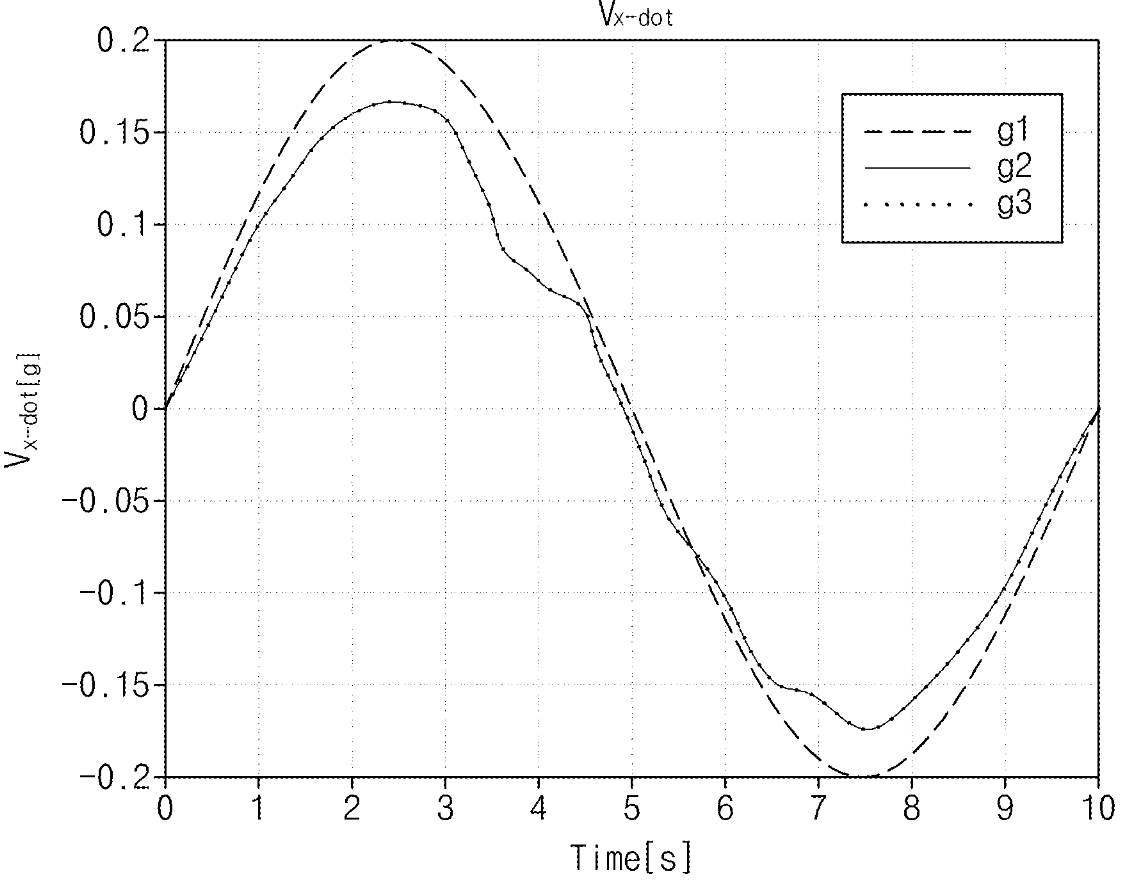
Figure 11:
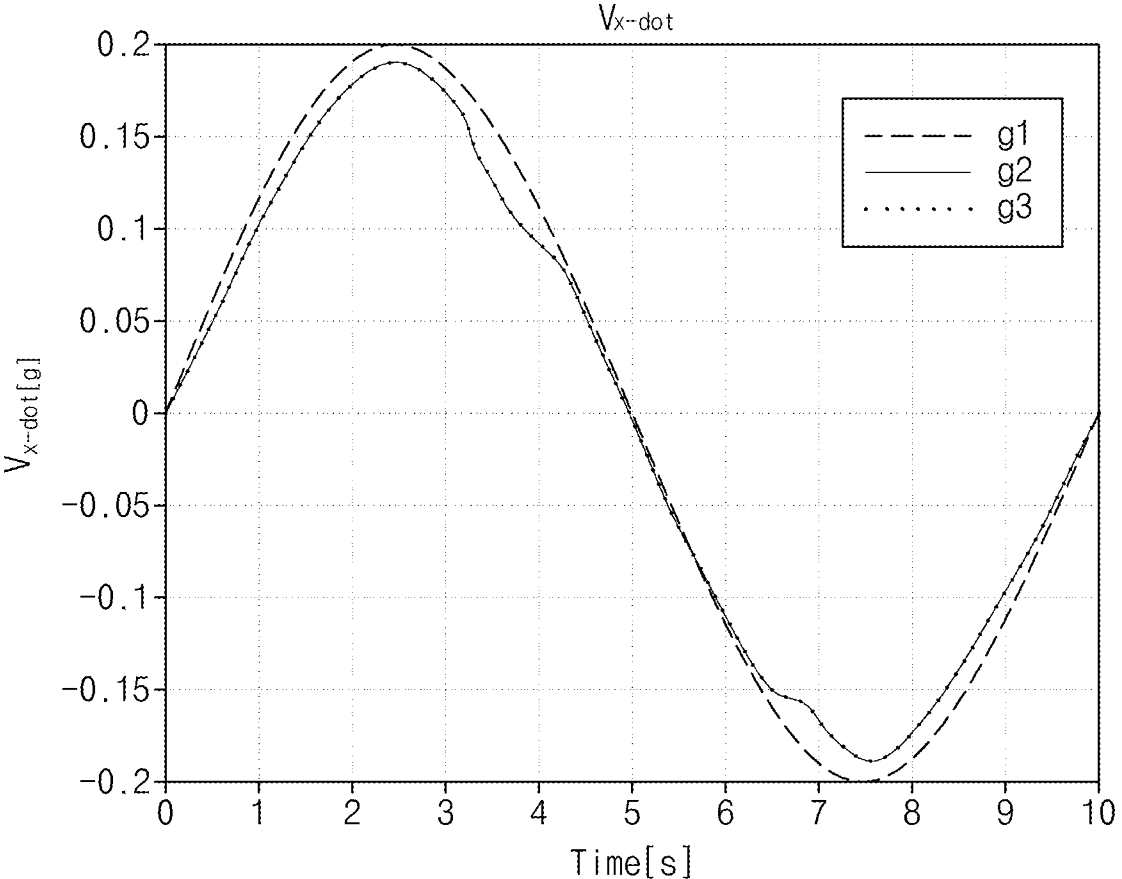

FIGS. 9 to 11 are diagrams showing simulation results for performance of following the longitudinal velocity according to an embodiment of the present disclosure. Referring to FIGS. 9 to 11, a first graph g1 represents the required velocity output by the driving assistance device 70, a second graph g2 represents the target longitudinal velocity generated by the processor 50, and a third graph g3 is a diagram showing results obtained by simulating an embodiment of the present disclosure using CarSim.

Referring to FIGS. 9 to 11, it may be seen that the larger the magnitude of the third weight q3, the higher the performance of the vehicle in following the required velocity output by the driving assistance device 70.

Figure 12:
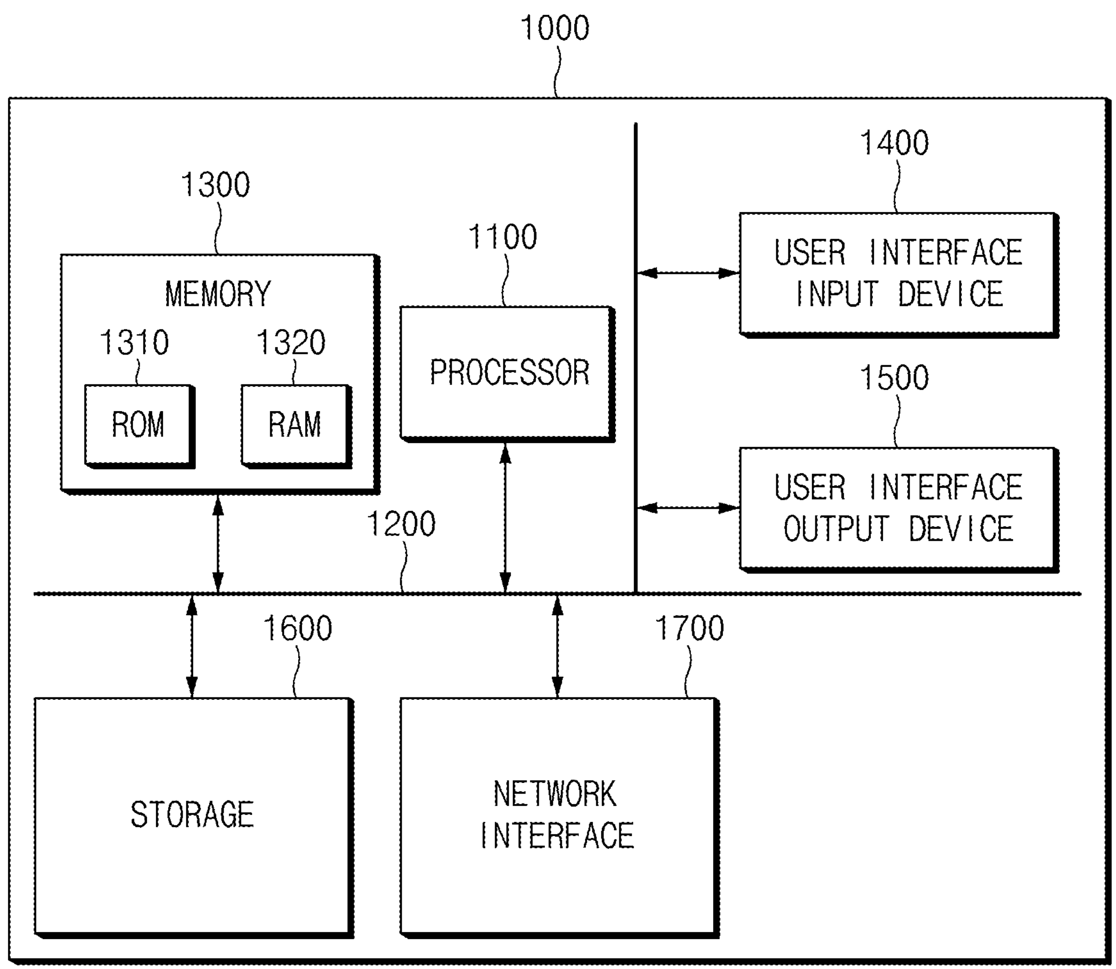
FIG. 12 illustrates a computing system according to an embodiment of the present disclosure.

FIG. 12 illustrates a computing system according to an embodiment of the present disclosure.

Referring to FIG. 12, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those having ordinary skill in the art to which the present disclosure pertains.

Accordingly, disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

According to the vehicle control device and the vehicle control method according to embodiments of the present disclosure, it is possible to optimize the following of the total acceleration and the required control quantity of the vehicle by controlling the velocity of the vehicle by the driving assistance system, thereby improving the ride comfort of the occupants.

Furthermore, according to the vehicle control device and the vehicle control method according to embodiments of the present disclosure, it is possible to improve the ride comfort of the occupants by minimizing the tracking error in a longitudinal acceleration, a total acceleration, and a required control quantity at the location of an occupant, unlike controlling the vehicle based on the center of gravity of the vehicle.

In addition, various effects may be provided that are directly or indirectly understood through the disclosure.

Hereinabove, although the present disclosure has been described with reference to some embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A vehicle control device comprising:

a sensor configured to obtain information about a driving environment of a vehicle;

a driving device configured to control behavior of the vehicle; and a processor configured to:

determine a required control quantity for controlling a velocity or acceleration of the vehicle based on the information obtained by the sensor, determine a longitudinal velocity of the vehicle to minimize a tracking error representing a degree of following the required control quantity while minimizing a total acceleration at a target location within the vehicle, and generate a control signal for controlling the driving device based on the longitudinal velocity of the vehicle.

2. The vehicle control device of claim 1, wherein the processor is configured to:

determine a longitudinal acceleration at the target location, considering a rotational motion around a center of gravity of the vehicle;

determine a lateral acceleration at the target location, considering a rotational motion around the center of gravity of the vehicle; and determine the longitudinal velocity of the vehicle to minimize the longitudinal acceleration and the lateral acceleration.

3. The vehicle control device of claim 2, wherein the processor is configured to determine the longitudinal acceleration at the target location based on the longitudinal acceleration of the vehicle, a lateral velocity of the vehicle, a yaw angular acceleration, a lateral distance between the center of gravity of the vehicle and the target location, a longitudinal distance between the center of gravity of the vehicle and the target location, and a yaw rate.

4. The vehicle control device of claim 2, wherein the processor is configured to determine the lateral acceleration at the target location based on the lateral acceleration of the vehicle, the longitudinal velocity of the vehicle, a yaw angular acceleration, a longitudinal distance between the center of gravity of the vehicle and the target location, a lateral distance between the center of gravity of the vehicle and the target location, and a yaw rate.

5. The vehicle control device of claim 4, wherein the processor is configured to set a target lateral velocity at the target location to zero.

6. The vehicle control device of claim 2, wherein the processor is configured to:

apply a first weight to the longitudinal acceleration at the target location in the vehicle;

apply a second weight to the lateral acceleration at the target location in the vehicle; and apply a third weight to the tracking error that follows the required control quantity.

7. The vehicle control device of claim 6, wherein the processor is configured to set a magnitude of the third weight to be larger as an expected collision time related to objects around the vehicle is shorter.

8. The vehicle control device of claim 6, wherein the processor is configured to set a magnitude of the third weight to be larger as a lateral behavior of the vehicle is smaller.

9. The vehicle control device of claim 1, wherein the processor is configured to:

determine a required velocity based on the driving environment; and determine the tracking error based on a difference between the required velocity and the longitudinal velocity of the vehicle.

10. The vehicle control device of claim 1, wherein the processor is configured to:

determine a required acceleration based on the driving environment; and determine the tracking error based on a difference between the required acceleration and a longitudinal acceleration of the vehicle.

11. A vehicle control method comprising:

determining a required control quantity for controlling a velocity or acceleration of a vehicle based on information about a driving environment of the vehicle;

determining a longitudinal velocity of the vehicle to minimize a tracking error representing a degree of following the required control quantity while minimizing a total acceleration at a target location within the vehicle; and generating a control signal for controlling a driving device of the vehicle based on the longitudinal velocity.

12. The vehicle control method of claim 11, wherein determining the longitudinal velocity of the vehicle includes:

determining a longitudinal acceleration at the target location, considering a rotational motion around a center of gravity of the vehicle;

determining a lateral acceleration at the target location, considering rotational motion around the center of gravity of the vehicle; and determining the longitudinal velocity of the vehicle to minimize the longitudinal acceleration and the lateral acceleration.

13. The vehicle control method of claim 12, wherein determining the longitudinal acceleration at the target location includes: using the longitudinal acceleration of the vehicle, a lateral velocity of the vehicle, a yaw angular acceleration, a lateral distance between the center of gravity of the vehicle and the target location, a longitudinal distance between the center of gravity of the vehicle and the target location, and a yaw rate.

14. The vehicle control method of claim 12, wherein determining the lateral acceleration at the target location includes: using the lateral acceleration of the vehicle, the longitudinal velocity of the vehicle, a yaw angular acceleration, a longitudinal distance between the center of gravity of the vehicle and the target location, a lateral distance between the center of gravity of the vehicle and the target location, and a yaw rate.

15. The vehicle control method of claim 14, wherein determining the lateral acceleration at the target location includes setting a target lateral velocity at the target location to zero.

16. The vehicle control method of claim 12, wherein determining the longitudinal velocity of the vehicle includes:

applying a first weight to the longitudinal acceleration at the target location in the vehicle;

applying a second weight to the lateral acceleration at the target location in the vehicle; and applying a third weight to the tracking error that follows the required control quantity.

17. The vehicle control method of claim 16, wherein applying the third weight includes:

determining an expected collision time related to objects around the vehicle; and setting a magnitude of the third weight to be larger as the expected collision time is shorter.

18. The vehicle control method of claim 16, wherein applying the third weight includes:

determining a lateral behavior of the vehicle; and setting a magnitude of the third weight to be larger as the lateral behavior of the vehicle is smaller.

19. The vehicle control method of claim 11, wherein determining the longitudinal velocity of the vehicle includes:

determining a required velocity based on the driving environment; and determining the tracking error based on a difference between the required velocity and the longitudinal velocity of the vehicle.

20. The vehicle control method of claim 11, wherein determining the longitudinal velocity of the vehicle includes:

determining a required acceleration based on the driving environment; and determining the tracking error based on a difference between the required acceleration and a longitudinal acceleration of the vehicle.

* * * * *